United States Patent [19]

Yates et al.

[11] 3,887,980

[45] June 10, 1975

[54] NUCLEAR FUEL BUNDLE DISASSEMBLY AND ASSEMBLY TOOL

[75] Inventors: Jack Yates; John W. Long, both of Richland, Wash.

[73] Assignee: Exxon Nuclear Company, Inc., Bellevue, Wash.

[22] Filed: Mar. 29, 1973

[21] Appl. No.: 345,831

[52] U.S. Cl............... 29/200 D; 29/256; 29/400 N; 294/24; 294/86 A
[51] Int. Cl............................................ B23p 19/04
[58] Field of Search ..... 29/227, 256, 200 D, 400 N; 294/19 R, 86 A, 24; 176/78; 81/53.1

[56] References Cited
UNITED STATES PATENTS

| | | | |
|---|---|---|---|
| 2,566,460 | 9/1951 | Mihalic | 29/227 X |
| 2,612,400 | 9/1952 | Facio | 294/19 R X |
| 2,807,495 | 9/1957 | Pillstrom | 294/19 R |

Primary Examiner—Al Lawrence Smith
Assistant Examiner—Harold P. Smith, Jr.
Attorney, Agent, or Firm—H. N. Wells

[57] ABSTRACT

A nuclear power reactor fuel bundle having a plurality of tubular fuel rods disposed in parallel array between two transverse tie plates is secured against disassembly by one or more locking forks which engage slots in tie rods which position the transverse plates. Springs mounted on the fuel and tie rods are compressed when the bundle is assembled thereby maintaining a continual pressure against the locking forks. Force applied in opposition to the springs permits withdrawal of the locking forks so that one tie plate may be removed, giving access to the fuel rods. an assembly and disassembly tool facilitates removal of the locking forks when the bundle is to be disassembled and the placing of the forks during assembly of the bundle.

7 Claims, 9 Drawing Figures

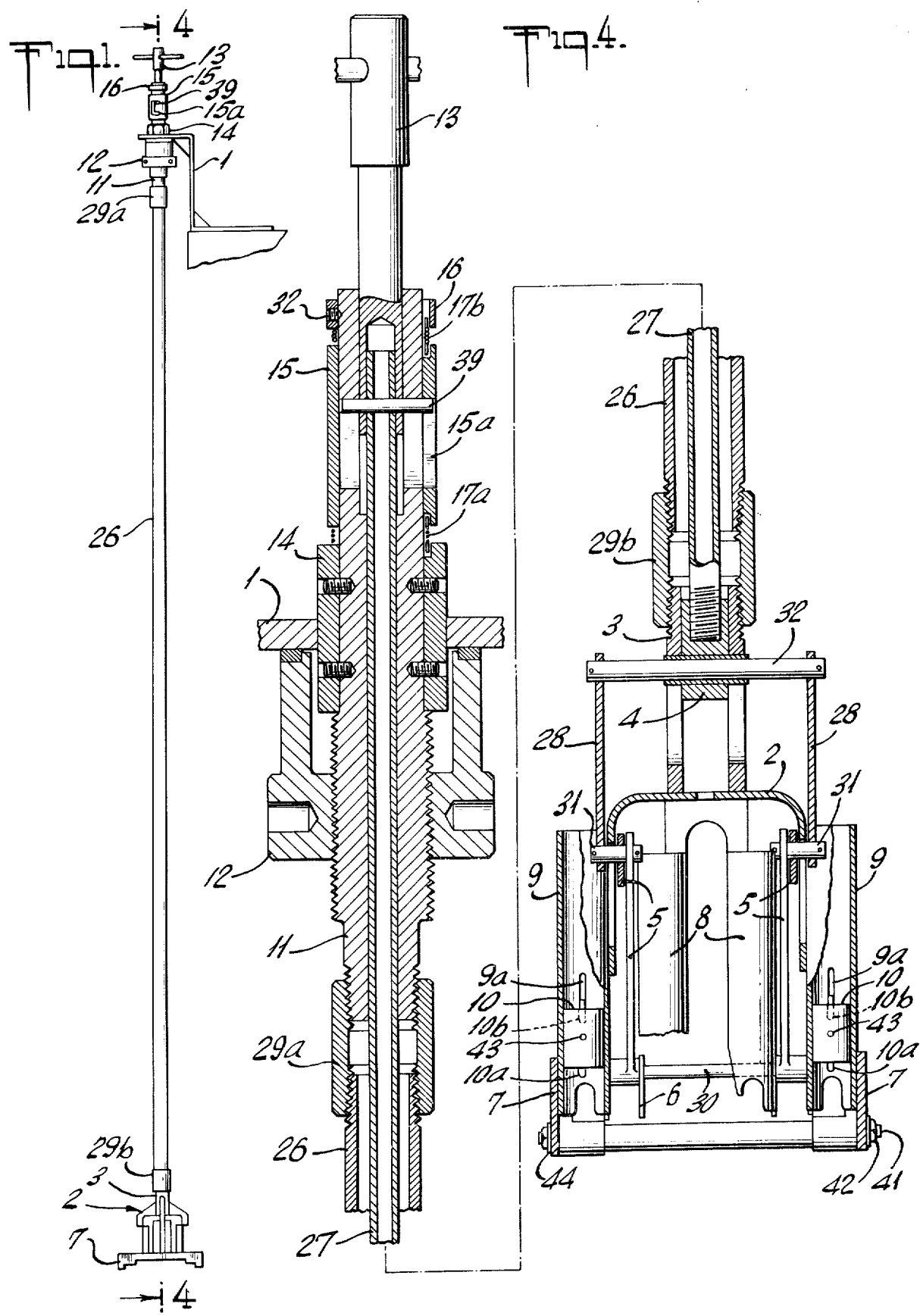

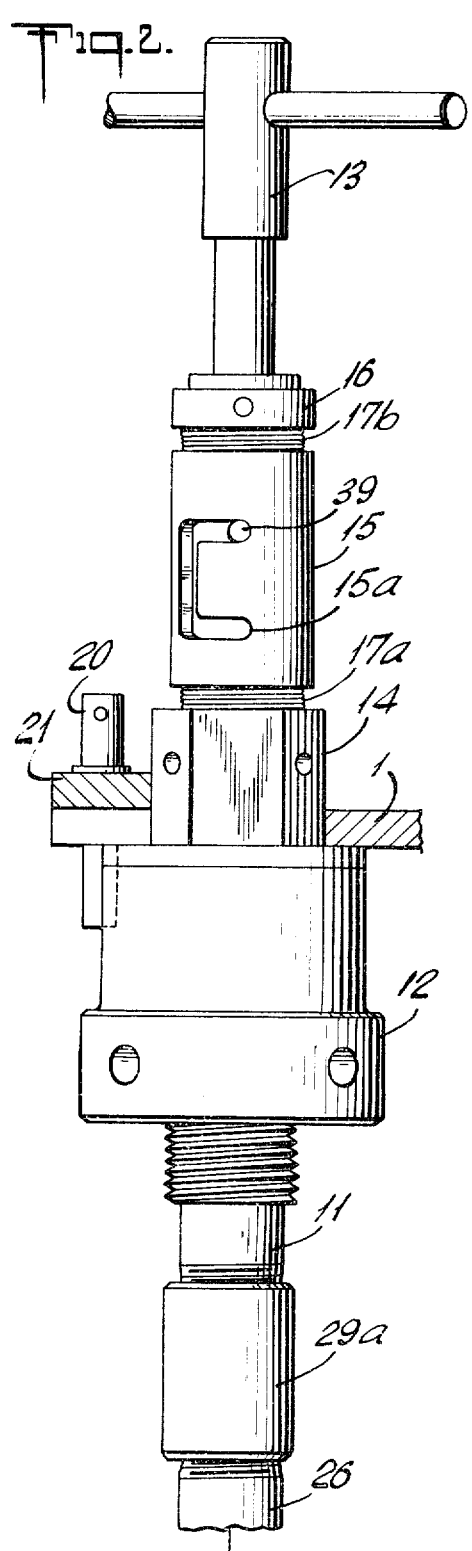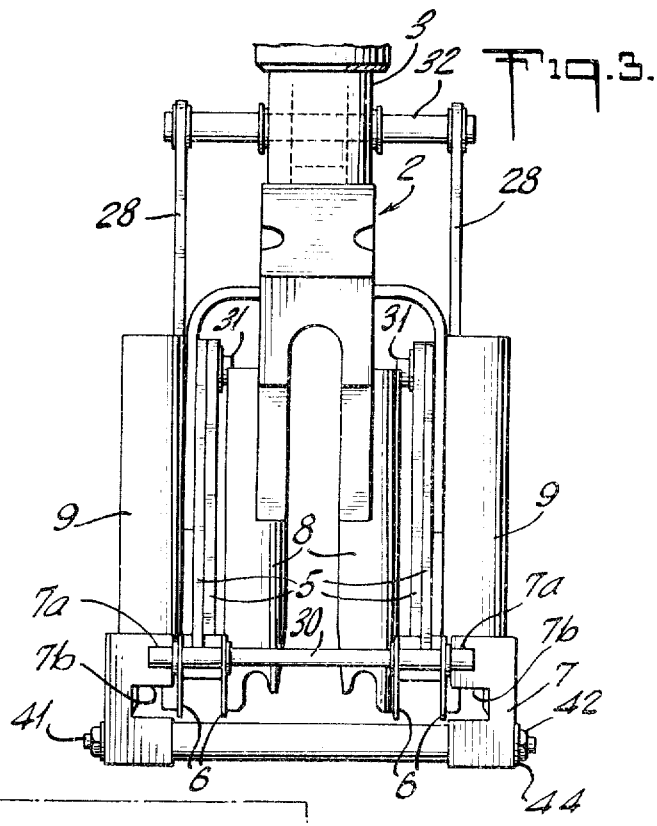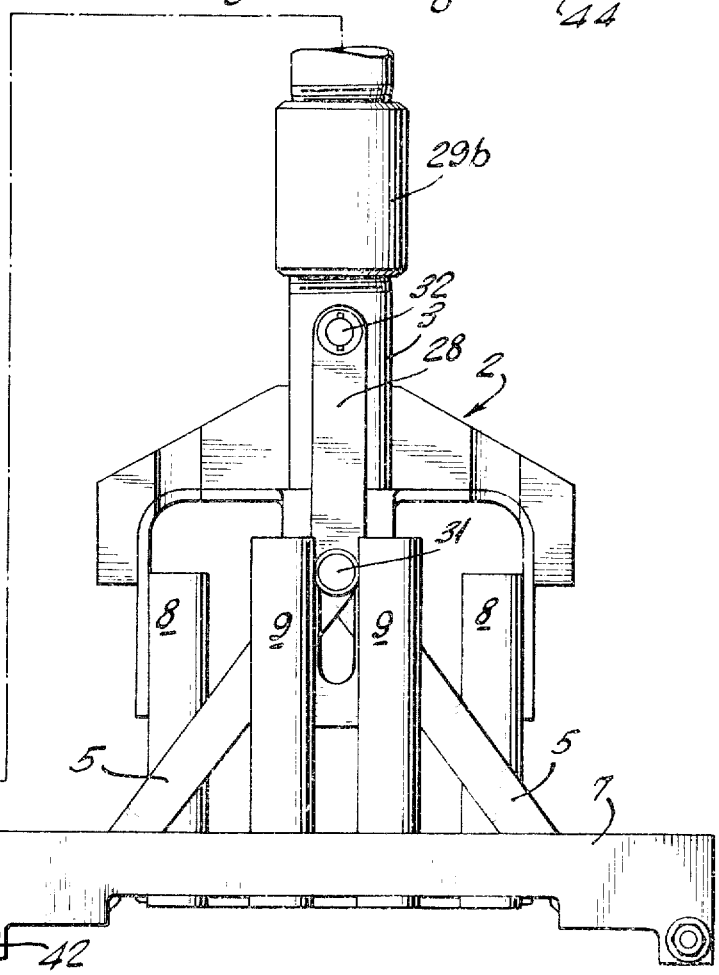

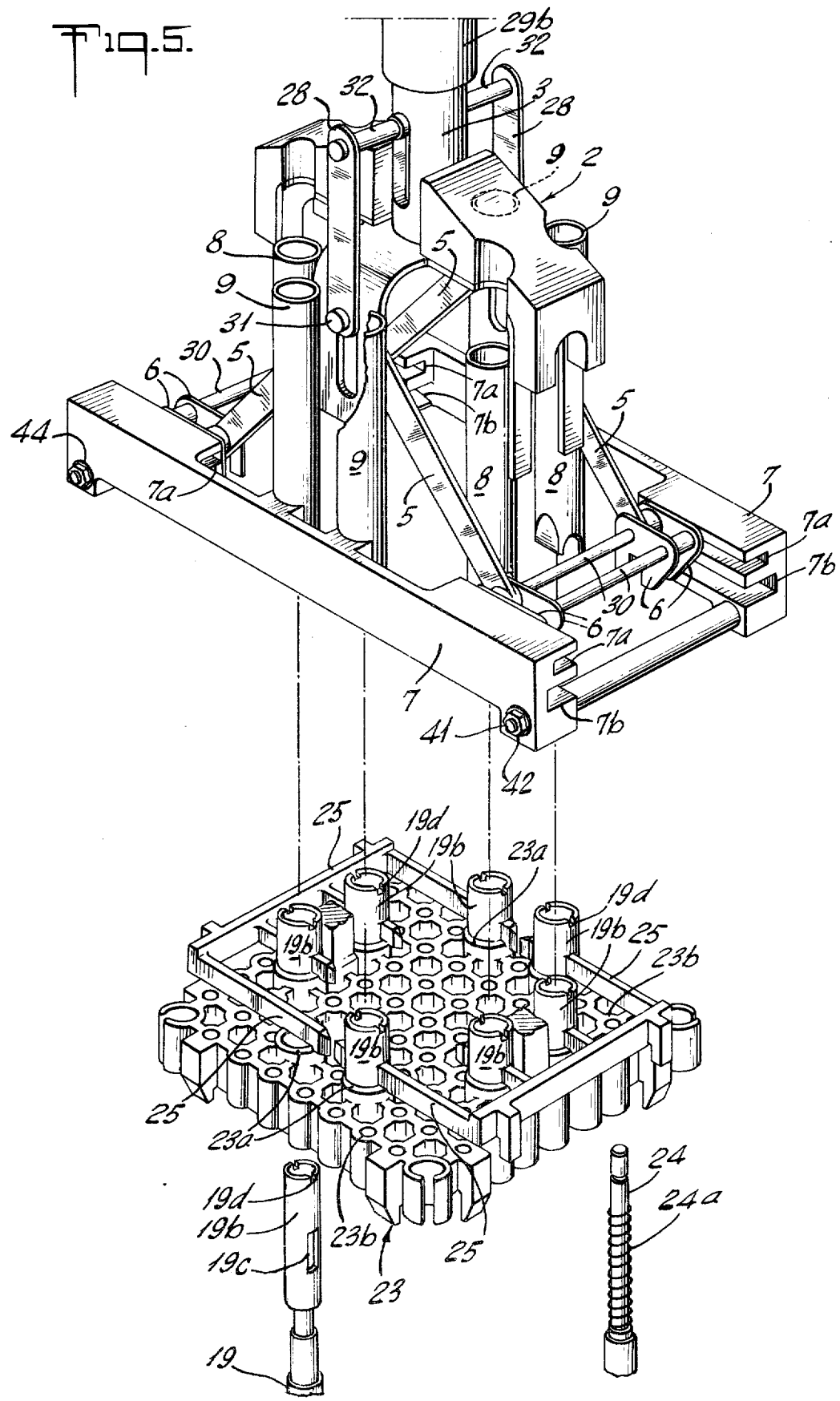

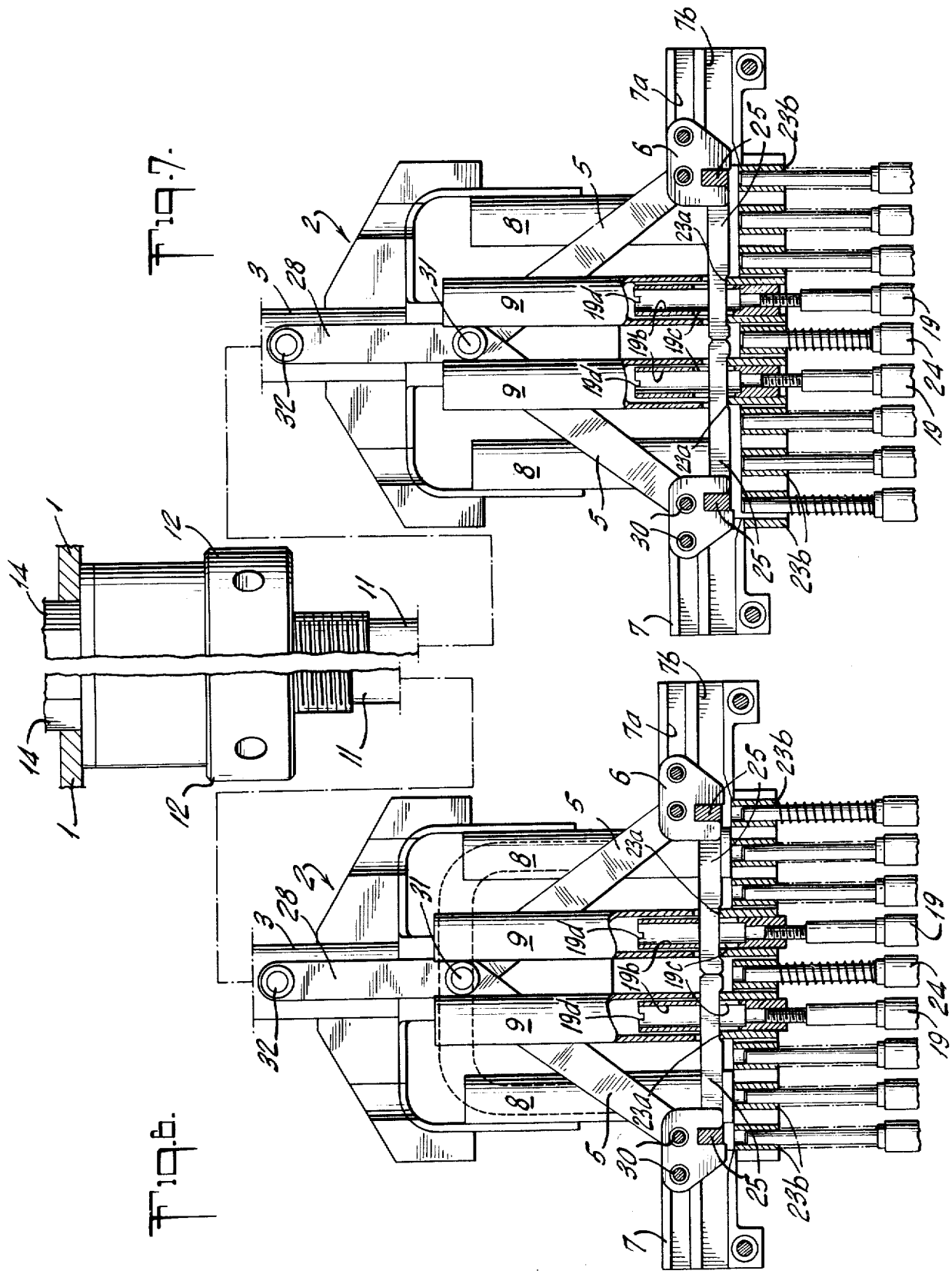

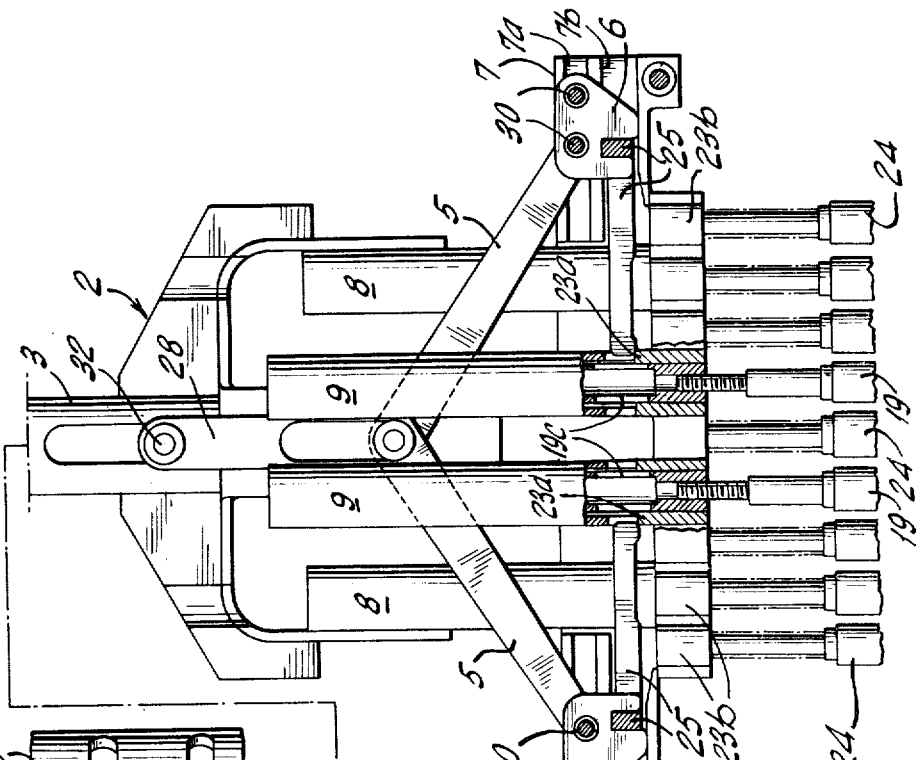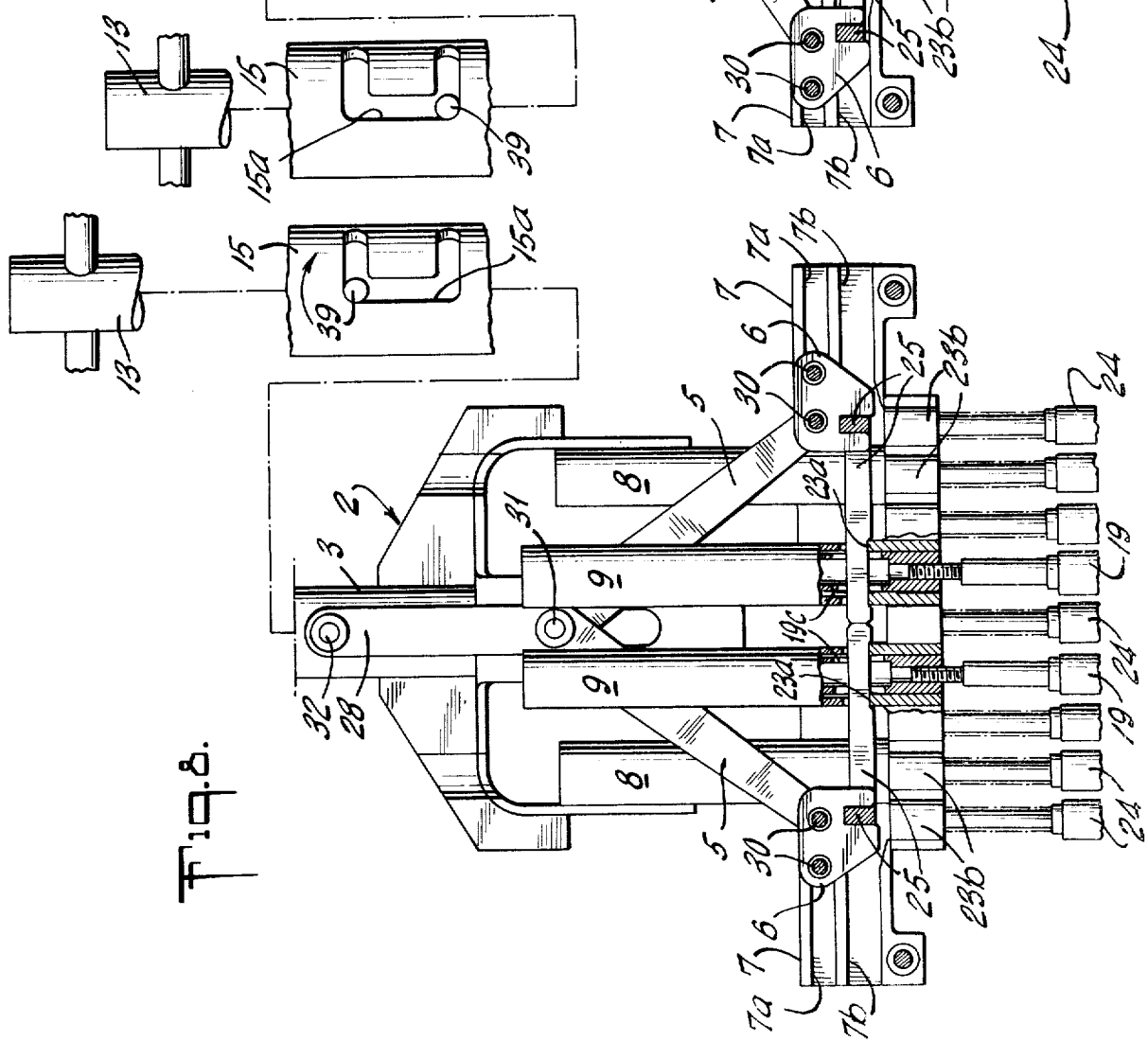

3,887,980

NUCLEAR FUEL BUNDLE DISASSEMBLY AND ASSEMBLY TOOL

REFERENCE TO RELATED APPLICATIONS

This application is related to U.S. Ser. No. 273,161, filed July 19, 1972, now abandoned, which is assigned to the assignee of the present application.

BACKGROUND OF THE INVENTION

The present invention relates to nuclear power reactor fuel bundles. More particularly, it discloses a novel tool which facilitates disassembly and assembly of a fuel bundle which is assembled according to the invention disclosed in the referenced application. The referenced application provides an improved fuel bundle assembly for nuclear power reactors. The bundle generally comprises a plurality of fuel rods in parallel array, positioned between a pair of transverse end plates. The nuclear fuel rods are positioned by openings in the end plates but the fuel rods "float" in the openings and are not secured thereto. In order to secure the end plates in position, tie rods are threaded at one end into the lower end plate and at the other end are secured within the upper end plate by means of locking forks which engage longitudinal slots in each tie rod. Springs surrounding the rods are compressed during assembly to force the upper end plate upward to the extent permitted by the locking forks which act as stops. The forks are removed by pressing down on the upper end plate against the spring force and exposing sufficient slot opening so that the locking forks can be withdrawn.

Inasmuch as this disassembly is done by remote control after the bundle has been irradiated in a nuclear power reactor, it is desirable to accomplish disassembly by means of a special tool, which is the subject of the invention.

SUMMARY OF THE INVENTION

A novel tool simplifies the disassembling of nuclear fuel bundles secured by the locking forks disclosed in related application U.S. Ser. No. 273,161. Alternatively, during assembly, a bundle may be secured by using the tool. Means are provided for uniformly depressing the upper tie plate, thereby opening slots in the tie rods to permit removal of the forks. The tool then removes and retains the locking forks permitting disassembly of the bundle. Means are provided to align the slots in the tie caps of the tie rods in order to permit insertion of the locking forks when the fuel bundle is assembled. These functions are accomplished by the detailed structure disclosed in the drawings and description which follows:

BRIEF DESCRIPTION OF THE DRAWINGS

FIG. 1 is an overall arrangement of the tool mounted in a supporting bracket.

FIG. 2 is an enlarged view of the major portions of FIG. 1.

FIG. 3 is an end view of the lower part of FIG. 2.

FIG. 4 is a sectional view taken along line 4—4 of FIG. 1.

FIG. 5 is an isometric view of the lower portion of the tool and the upper tie plate with the locking forks engaged with the tie rods, indicating the relation between the tool and the locking forks.

FIGS. 6, 7, 8 and 9 illustrate, in sequence, the operation of the tool in removing locking forks from an assembled bundle.

DESCRIPTION OF THE PREFERRED EMBODIMENT

In the discussion which follows, it will be generally assumed that a fuel bundle is to be disassembled to simplify the description.

In order to remove the locking forks which secure the upper tie plate of the nuclear reactor fuel bundle, it is necessary to perform the following functions by means of the tool described hereinafter: (1) the upper tie plate must be uniformly depressed in order to open the slots in the upper tie caps of the tie rods to permit removal of the locking forks; (2) the locking forks must be moved parallel to the surface of the upper tie plate in order to disengage the forks from the slots in the tie caps; (3) the locking forks must be retained by the tool after their removal. It should be noted that if the bundle is disassembled after having been irradiated in a nuclear reactor, this operation must be done by remote control. Thus, fork retention is an important function. Also, the tool must engage the tie caps and align them in order for the slots to be properly positioned to receive the locking forks during reassembly. Since in the preferred embodiment each fork engages four tie rods, these must be correctly aligned.

In order for the tool to remove the locking forks, it is necessary for the fuel bundle to be resting upon a rigid support at the bottom with the upper end free to be engaged by the tool. The tool itself must react against a support in order to depress the tie plate as is required in order to engage or disengage the locking forks. FIG. 1 illustrates the tool in position in an upper support bracket 1. FIG. 1 is shown in part in an enlarged view in FIG. 2. The tool is secured in upper support bracket 1 by retaining piece 21 and pins 20. In order to depress the upper tie plate, threaded collar 12 is rotated against the fixed support plate 1 to force upper end body 11 in a downward direction. This downward motion is transferred to the upper tie plate (not shown) through couplings 29($a$) and ($b$) and outer tube 26 via the lower end body 2 and guide tubes 8 and 9, which rest directly on bosses of the upper tie plate. This downward force causes the upper tie plate to move in a downward direction, opposing the springs which force the tie plate upward. In moving downward, the slots in the upper tie caps of the tie rods are exposed, making it possible for the locking forks to be removed. Once the tie plate has been depressed, the locking sleeve 15 is rotated about sixty degrees, freeing roll pin 39 which can then move within slot 15($a$) when handle 13 is depressed. Once the pin 39 has reached the bottom of slot 15($a$), locking sleeve 15 is returned to its original position by torsion springs 17($a$) and ($b$), thus locking the handle in its downward position. The downward movement of the handle is transmitted through an interior tube, to be described in detail later, into a downward movement against links 28 and ultimately translated into a horizontal force through levers 5. Levers 5 engage the locking forks and move the locking forks in a direction parallel to the plane of the surface of the upper tie plate.

FIG. 3 shows the lower portion of the tool viewed at a right angle from that shown in FIG. 2. In this view may be seen cross pin 32 and links 28 which transfer the downward motion of the lower end plunger 4 into horizontal movement by means of levers 5. Fork sliders 6 engage the locking forks and move them outwardly with a downward movement from the lower end plunger 4 and the connecting parts. Also may be seen the use of the guide tubes 8 (inner) and 9 (outer) which rest on the raised bosses on the upper tie plate through which the tie rods pass. The locking forks slide within slots 7a and 7b cut in the side guides 7 which are spaced and secured by means of spacer 41, washer 44 and lock nut 42.

FIG. 4 shows a sectional view of the tool taken substantially along line 4—4 of FIG. 1. When removing the locking forks the tool has two basic functions: first, to depress the upper tie plate; and second, to retract the locking forks. The structure may be viewed in terms of these two functions as follows. Once the removal tool has been positioned within the upper support bracket 1, threaded collar 12 is moved in an upward direction until it engages and exerts pressure upon the support bracket. Since it is fixed, the effect is to apply a downward force to the remainder of the tool assembly which is free to move. This force is directed downwardly from the threaded collar 12 through upper end body 11, threaded coupling 29(a), outer tube 26, lower threaded coupling 29(b), lower end sleeve 3, lower end body 2 and guide tubes 8 and 9. Guide tubes 8 and 9 are placed on the raised bosses on the upper tie plate through which the upper ends of the tie rods pass. The downward force on the guide tubes 8 and 9 is directed onto the raised bosses and forces the upper tie plate in a downward direction against the spring pressure resulting from the helical springs which usually surround both the tie rods and the fuel rods (see FIG. 5). Additional slot area is exposed above the raised boss, making it possible for the locking forks to be withdrawn.

Once the locking forks are free to move they are retracted by means of a downward force acting upon handle 13. Until this time, handle 13 has been locked in its upper position by means of roll pin 39. The handle 13 is now freed by rotating locking sleeve 15 sixty degrees against the resistance of torsion springs 17(a) and (b). The roll pin 39 then may be moved in a downward direction. This is accomplished by means of the C-shaped slot 15(a) which is formed in locking sleeve 15 (see FIG. 2). In FIG. 2 the pin is illustrated in its upper position as is true also of FIG. 4. This is the position in which the locking forks are fully engaged. The roll pin 39 would begin its movement at the bottom of the C when the reverse process is carried out. Once the handle 13 is free to move, a downward force is placed upon it which is directed through inner mandril 27, which extends from handle 13 into lower end plunger 4 within the lower end sleeve 3. This downward force is directed to cross pin 32 which is free to move within a slot cut within the lower end sleeve 13. Cross pin 32 directs the downward force through links 28 to the lever pins 31 and from there through levers 5 to the fork sliders 6, thus translating the downward motion from handle 3 into horizontal motion of the fork sliders 6. The fork sliders 6, being engaged with the locking forks, thus remove the forks which had been freed in the previous operation. Once the forks have been freed they are held within the slots 7a and 7b cut in side guides 7.

FIG. 5 is an isometric view which illustrates both the structure and suggested mode of operation of the lower portion of the tool. In FIG. 5, the upper tie plate, shown generally as 23, may be seen. For additional structure see the companion application U.S. Ser. No. 273,161. The upper tie plate 23 contains in this embodiment eight raised bosses 23(a), through which pass eight tie rods which are used to hold the assembled bundle together. The upper portion of a typical fuel rod 24 which passes through openings 23(b) in the tie plate 23 is shown in the lower portion of the illustration. It will be noted that a helical spring 24a is shown placed about the upper end of the fuel rod. It is the force exerted by compression of these springs 24a which tends to force the upper tie plate 23 in a vertical direction and which must be opposed in order to move down the upper tie plate 23, making it possible to remove the locking forks 25. Once the lower portion of the tool is placed over the assembled bundle it can be seen that guide tubes 8 and 9, each being suitably cut out, rest directly upon the raised bosses 23(a). Thus, downward force exerted upon those bosses forces the upper tie plate in a downward direction against the opposed spring force. Also, when the removal tool is placed upon the fuel bundle, the fork sliders 6 rest over and engage the locking forks 25. When the locking forks are free to move because the upper tie plate 23 has been depressed, the retraction mechanism is activated by rotating locking sleeve 15 so that the fork sliders may be moved in an outward direction, parallel to the plane of the upper tie plate 23. Although it appears in the illustration that the slots in the tie caps of the tie rods are completely filled by the locking forks, it should be understood that the slots are in fact longer, a portion being hidden within the raised bosses 23(a). Thus, if the raised bosses 23(a) are moved down, additional slot opening will be exposed, making it possible to remove the locking forks 25. The upper end of a typical tie rod 19 is shown in FIG. 5. The rod 19 terminates in an end cap onto which is threaded tie cap 19b, which contains the locking fork slot 19c and slot 19d.

The operation wherein the locking forks 25 are disengaged from the tie rods is illustrated in sequence in FIGS. 6, 7, 8 and 9. FIG. 6 illustrates the upper tie plate 23 fully assembled at the start of the operation and with the lower portion of the tool being in place and engaging the locking forks 25.

In FIG. 7, the first step of the removal process has occurred. Downward force has been exerted through the guide tubes 8 and 9 upon the raised bosses thus forcing the upper tie plate in a downward direction, exposing additional slot area so that the locking forks may be disengaged. In this view the locking forks 25 are seen to have an overhanging lip which engages the raised bosses of the upper tie plate and prevents its being accidentally removed before insertion into or during operation of the reactor. For this reason, additional slot area must be exposed in order to remove the locking forks 25.

In FIG. 8, the second step of the removal process has begun. The locking sleeve 15 has been rotated sixty degrees so that the roll pin 39 is in position to permit downward movement of the handle 13, and thereby to initiate the horizontal movement of the locking forks.

In FIG. 9, the process has been completed; the roll pin 39 is shown at the lower portion of the C-shaped slot 15(b). Downward force on handle 13 has resulted in an outward movement of the levers 5 to withdraw the locking forks 25 by means of the fork sliders 6. The locking sleeve 15 will be rotated back sixty degrees by torsion springs 17(a) and (b) and the roll pin 39 will move into the lower right corner of the C in order to lock the locking forks 25 in their retracted position.

After the removal of locking forks, the screwed collar 12 may be rotated in the opposite direction relieving the force acting in a downward direction upon the upper tie plate 23, permitting it to move upwardly under the force of the compressed helical springs 24(a). Once this force has been fully relieved and the tool removed, the upper tie plate 23 may be removed to permit access to the fuel rods.

When the reverse process is to be carried out, that is the locking forks are to be engaged with the tie rods, the process may be reversed with the exception that the upper tie plate must be depressed again in order to expose sufficient slot area for the locking forks 25 to be engaged. The locking forks 25 begin movement in the outermost direction and the roll pin 39 is in the lower right-hand portion of the C-shaped slot 15(b) as in FIG. 9. That is, the first major step, that of depressing the upper tie plate, is the same as previously carried out; otherwise, insertion of the forks 25 requires a reversal of the procedure used for their removal. Since the tie rods 22 are threaded into the lower tie plate, they have an upper tie cap threaded onto the upper end of each tie rod which is free to move within the upper tie plate so that the slots may be properly aligned to receive the locking forks. To assist in making the proper alignment of the slots, the guide tubes 8 and 9 each contain a spring-loaded plug 10 (see FIG. 4) having a male portion 10(a) which engages slot 19d located at the top of each tie cap 19b (FIG. 5). At the upper end of each plug 10 is a slot 10(b) which is engaged by a long tool (not shown) which is introduced through the upper end of each of the guide tubes 8 and 9. Each of the plugs 10 is rotated by means of the long tool until the male portion 10(a) is engaged with slot 19d in the tie cap 19b of the corresponding tie rod 22. Then, rotation continues until a spring ball plunger 10(c) in each plug engages a narrow slow [8(a) or 9(a)] in the side of each guide tube and positioned so as to properly orient the slot 19d in the tie cap 19b on each tie rod 19 to engage the locking fork.

The foregoing description of the preferred embodiment of the present invention is not intended to limit the scope of the invention which is defined by the following claims:

What is claimed is:

1. A tool for assembling and disassembling a nuclear power reactor fuel bundle of the type having a plurality of tie rods in parallel array, each of said rods being secured at one end to a lower tie plate disposed normal to the axes of said tie rods and the other end extending through openings in an upper tie plate, said tie plates having openings for accepting and positioning fuel rods in parallel array therebetween, and wherein each of said tie rods is provided with an elongated slot near the end extending through said upper tie plate for receiving the tines of a locking fork to secure said tie plates against separation by compressed springs mounted therebetween, said tool comprising in combination:

(a) a means for depressing said upper tie plate relative to said tie rods and toward said lower tie plate against the pressure of said compressed springs by acting against a rigid support fixed in position relative to said lower tie plate and thereby exposing said tie rod slots;

(b) locking fork carrier means for engaging and moving said locking forks in a direction substantially parallel to said upper tie plate after said upper tie plate has been depressed by said depressing means of (a), said carrier means mounted on said depressing means and capable of moving independently thereof, said fork carrier means being operated by a force directed normal to said upper tie plate and including a means for translating said normal force into a force parallel to said upper tie plate for moving said locking forks;

c. means for engaging and disengaging said depressing means and said fork carrier means whereby said depressing means may be engaged with said fork carrier means when said upper tie plate is depressed and disengaged when said locking forks are moved by said carrier means.

2. The tool of claim 1 further comprising means for aligning said tie rods mounted on said depressing means of (a) so that the slots in said rods are properly positioned to receive said locking forks.

3. The tool of claim 1 wherein said means for depressing the upper tie plate comprises a first elongated substantially tubular body member having a C-shaped slot and a plurality of guide tubes disposed at one end thereof through which member force may be exerted through said guide tubes upon raised tie plate bosses around the openings through which said tie rods extend, said elongated substantially tubular member having a threaded circumferential coupling disposed for engagement with said fixed support of (a), thereby permitting force to be placed upon said upper tie plate by threading said coupling against said fixed support bracket.

4. The tool of claim 3 wherein said locking fork carrier means comprises fork sliders operatively disposed outwardly of said depressing means to engage and move said locking forks in a direction substantially parallel to said upper tie plate.

5. The tool of claim 4 wherein said means for translating normal force to parallel force comprises a second elongated body member disposed inside said first elongated body member and operatively connected to said fork sliders through lever arms attached to said second elongated body member.

6. The tool of claim 5 wherein said engaging and disengaging means comprises a pin passing transversely through both said first and second elongated body members and terminating in said outer body member within said C-shaped slot whereby when said pin is located in a horizontal portion of said C-shaped slot, said elongated body members can be moved vertically only together but when said pin is located within the vertical portion of said C-shaped slot said body members are free to move independently of each other to the extent permitted by the height of said vertical portion.

7. The tool of claim 2 wherein said means for aligning said tie rods comprise spring loaded plugs positioned internally of guide tubes disposed at one end of said depressing means of (a) which engage the raised bosses through which the tie rods pass, each of said plugs having a male member to engage a slot in the top of the corresponding tie rod and a slot at the upper end of said plug to receive a tool for rotating said plugs and a spring ball plunger disposed to engage a slot provided in said guide tube, thereby indicating when correct positioning of the tie rod slots has been achieved.

* * * * *